Figure 14:
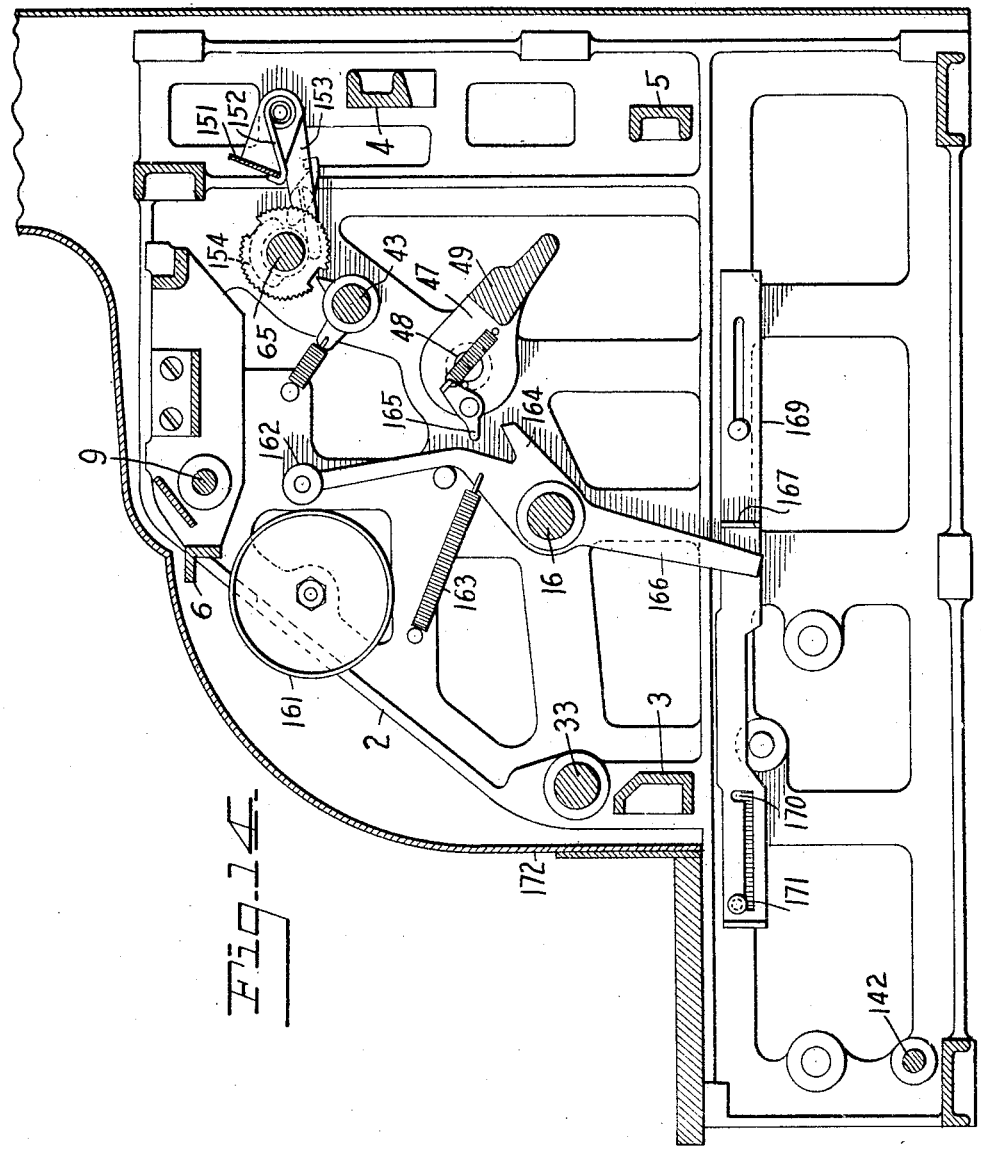

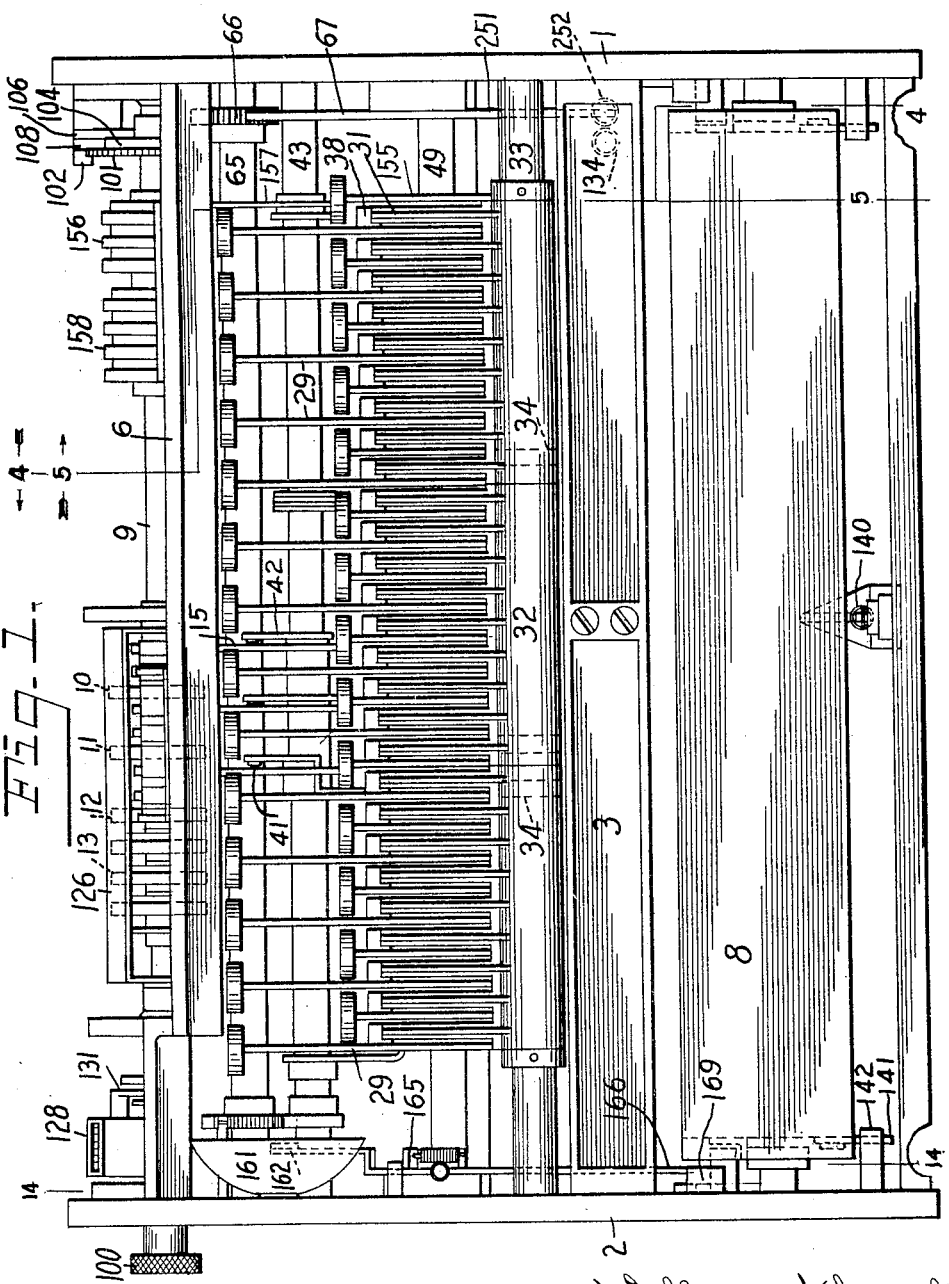

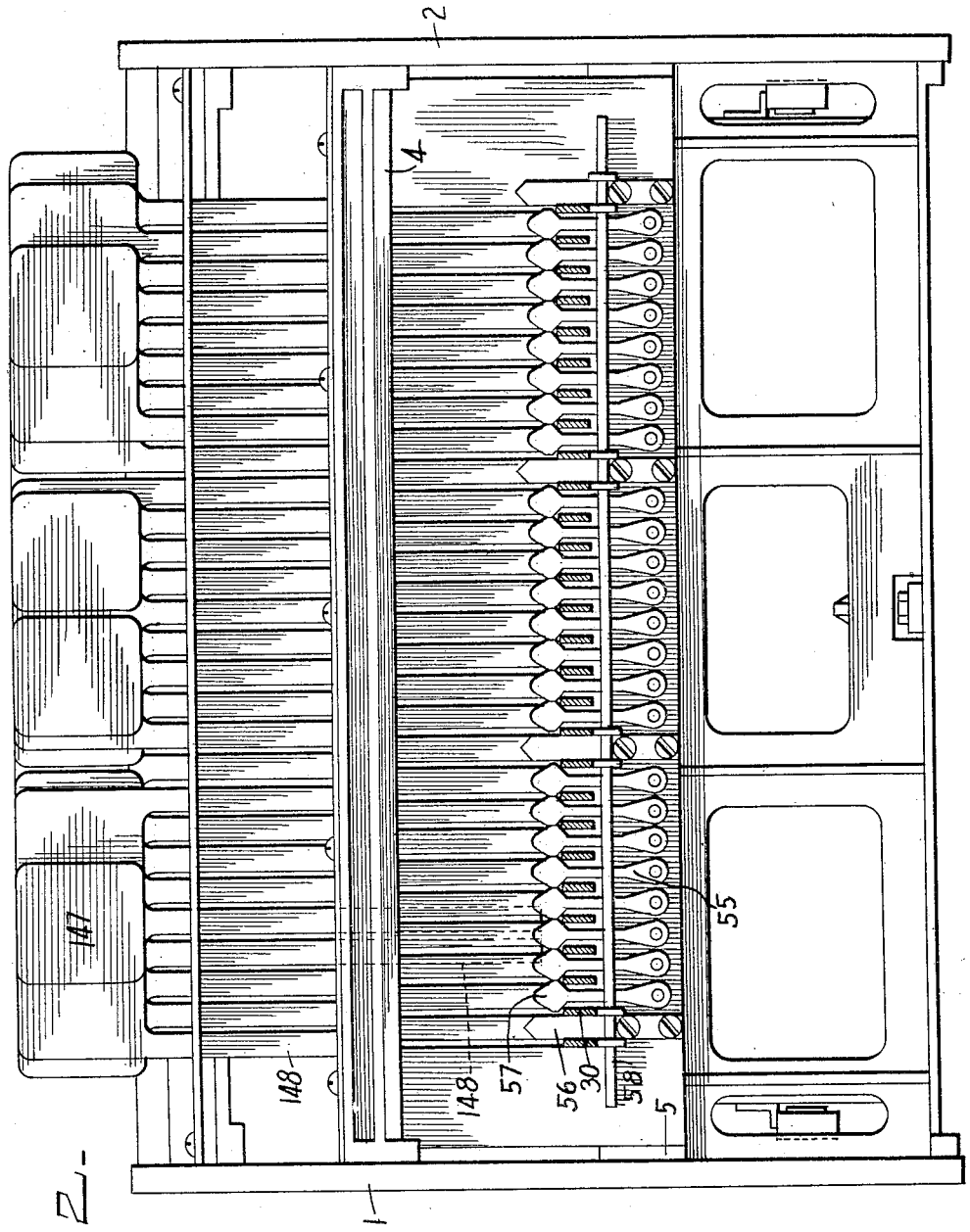

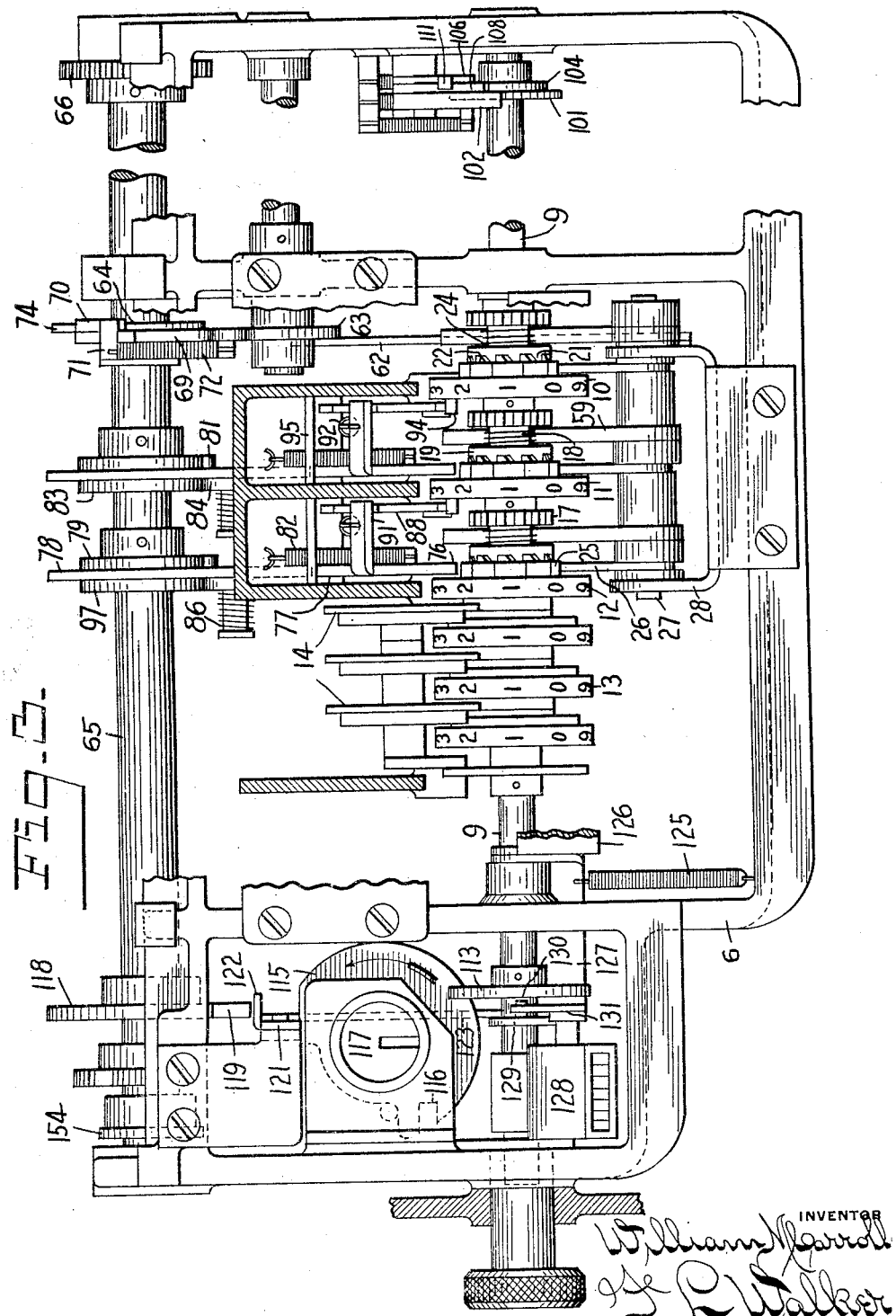

April 5, 1932.  W. M. CARROLL  1,853,015
CASH REGISTER
Filed Oct. 4, 1926  9 Sheets-Sheet 4
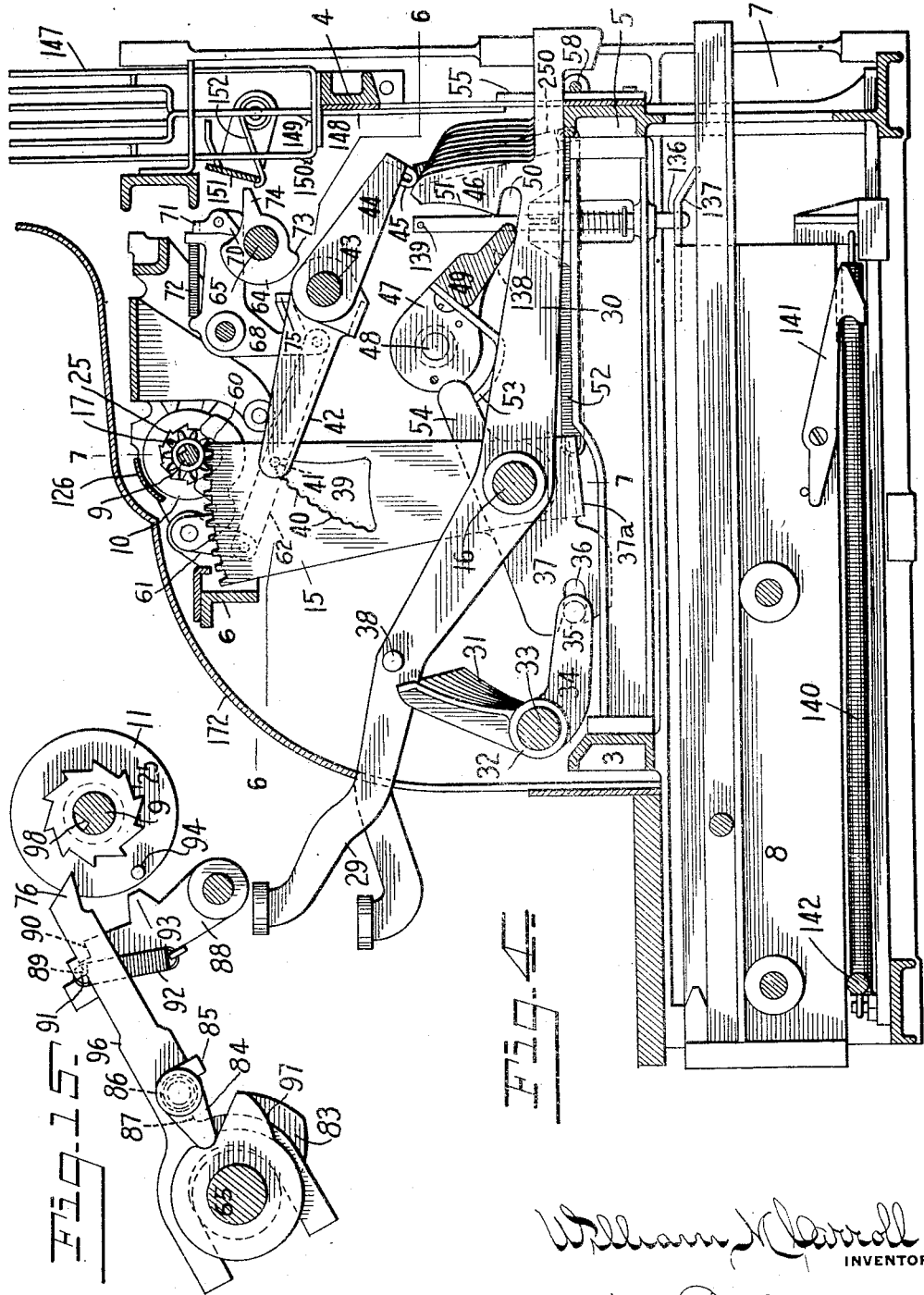
William M Carroll
INVENTOR
F. L. Walker
ATTORNEY April 5, 1932.  W. M. CARROLL  1,853,015
CASH REGISTER
Filed Oct. 4, 1926   9 Sheets-Sheet 5
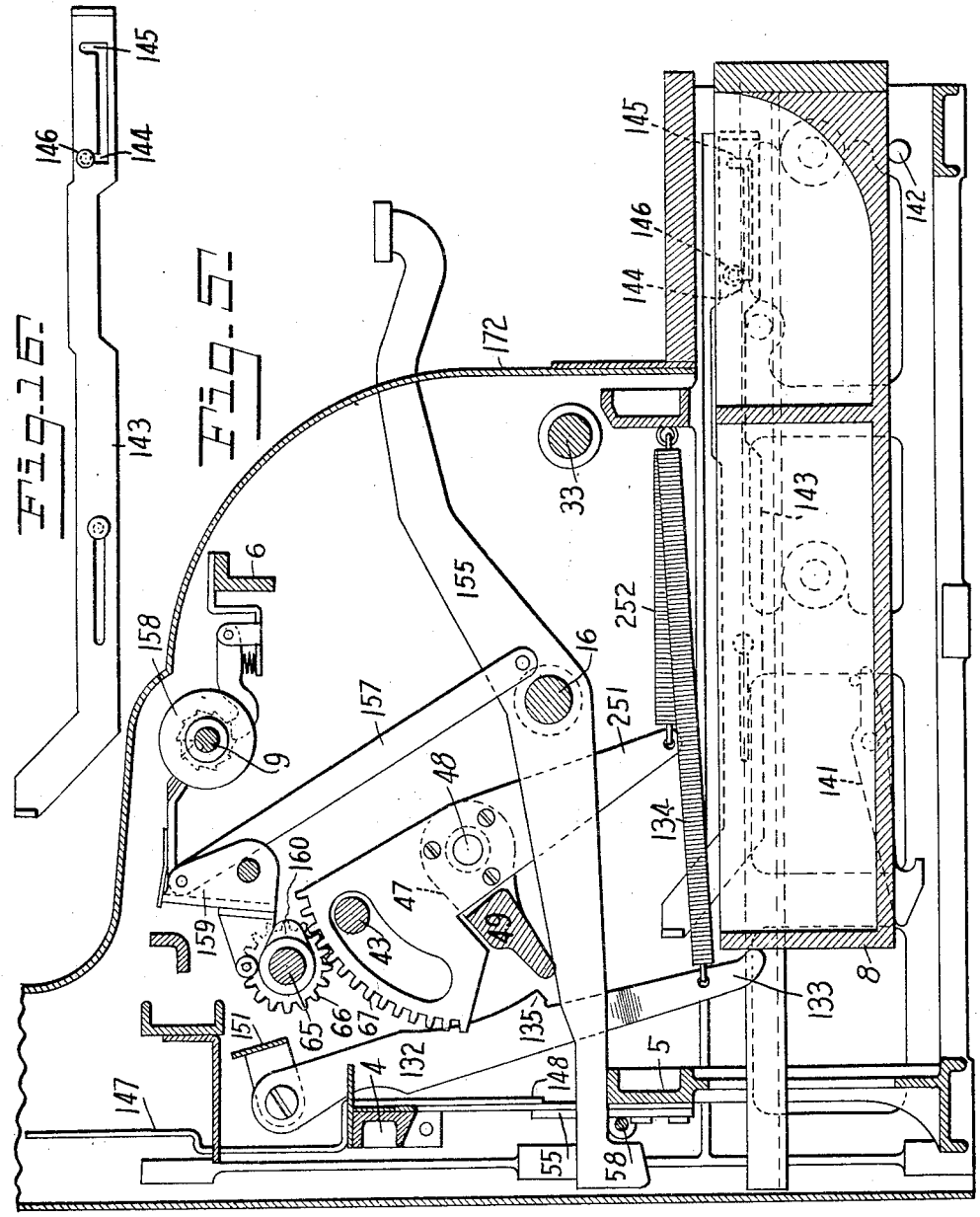
William M. Carroll
INVENTOR
F. L. Walker
ATTORNEY April 5, 1932. W. M. CARROLL 1,853,015
CASH REGISTER
Filed Oct. 4, 1926 9 Sheets-Sheet 6
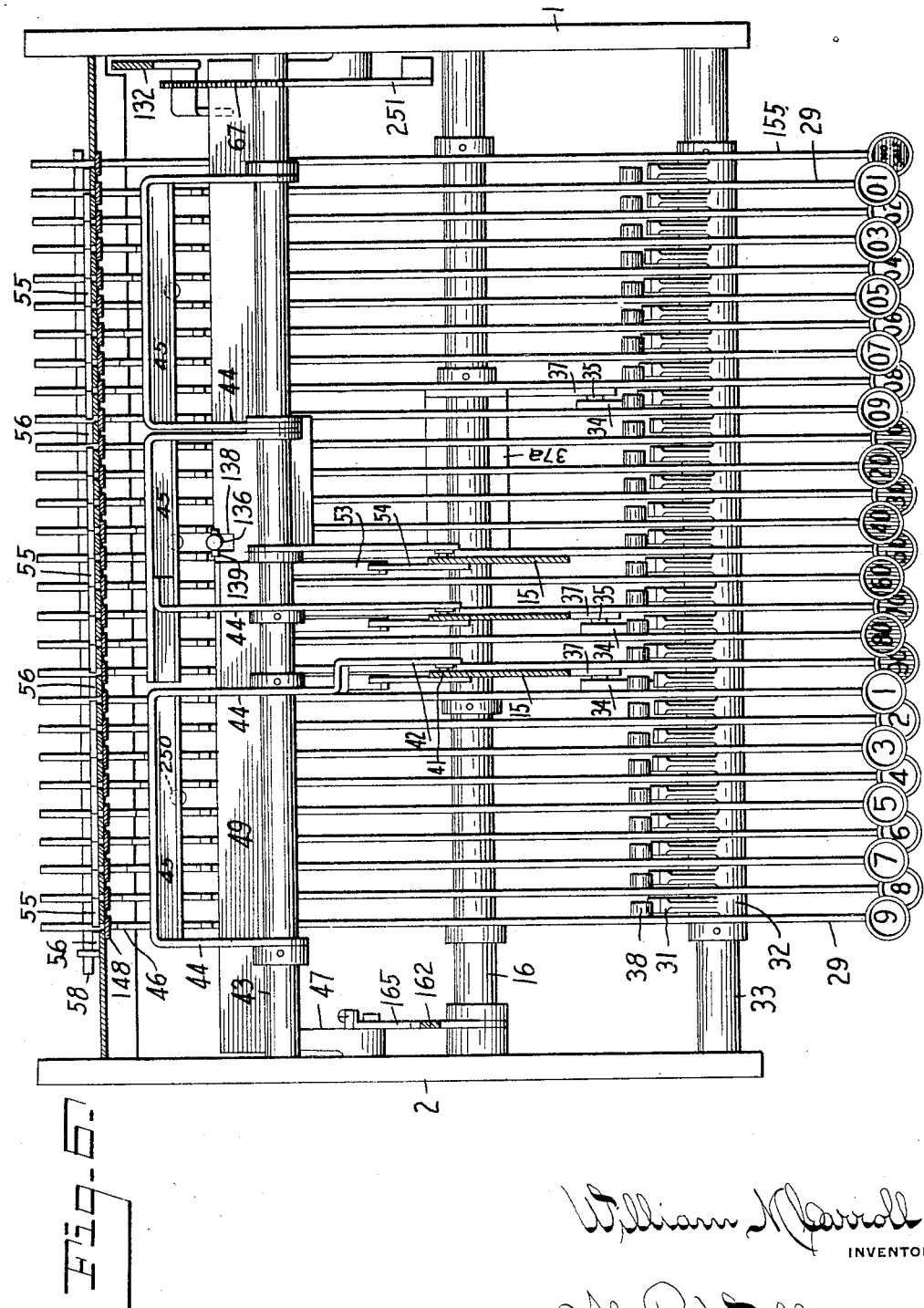

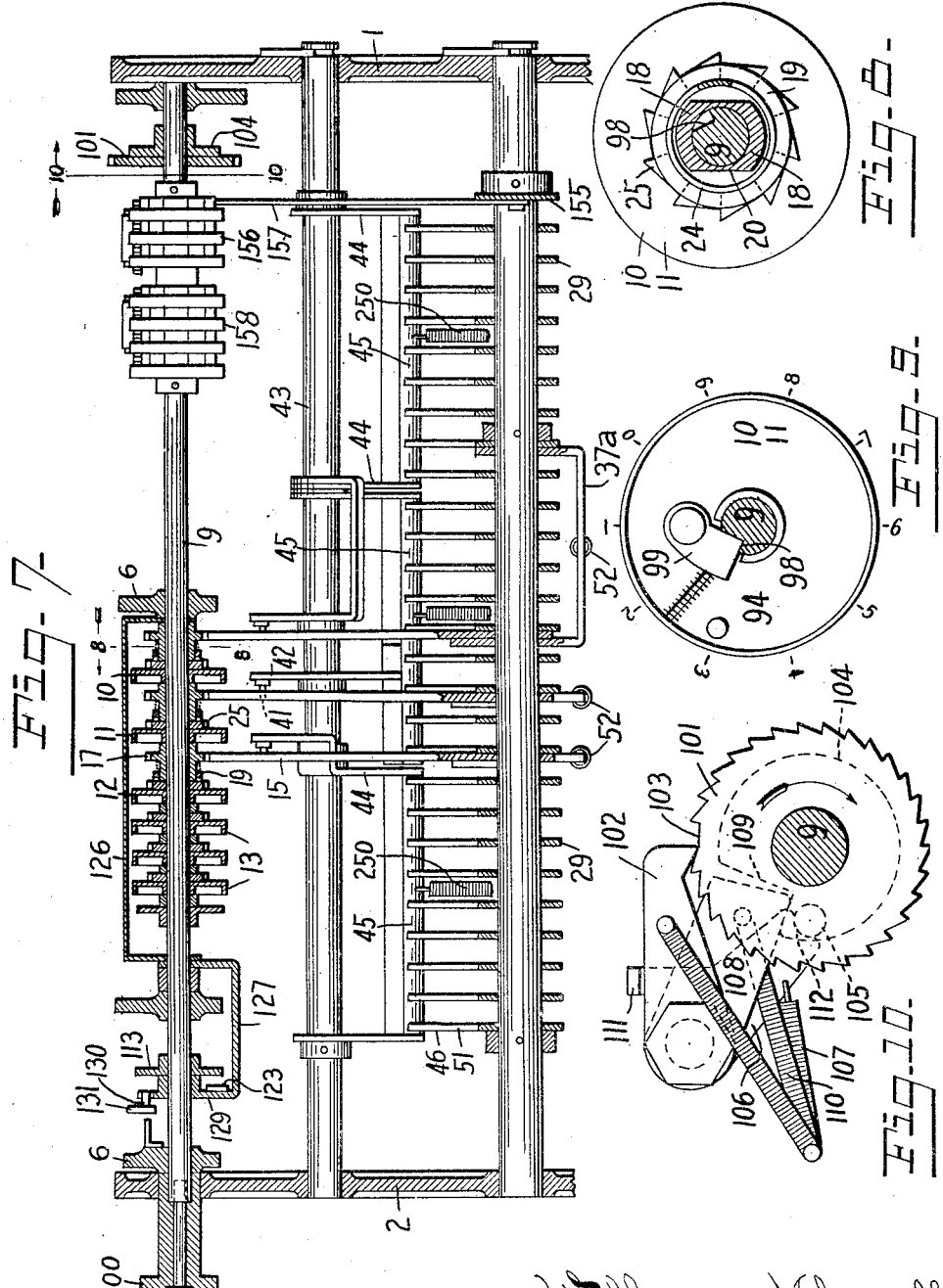

April 5, 1932.  W. M. CARROLL  1,853,015

CASH REGISTER

Filed Oct. 4, 1926   9 Sheets-Sheet 8

William M. Carroll INVENTOR

ATTORNEY

April 5, 1932. W. M. CARROLL 1,853,015
CASH REGISTER
Filed Oct. 4, 1926 9 Sheets-Sheet 9

William M Carroll
INVENTOR

F. L. Walker
ATTORNEY

Patented Apr. 5, 1932

1,853,015

UNITED STATES PATENT OFFICE

WILLIAM M. CARROLL, OF DAYTON, OHIO, ASSIGNOR, BY MESNE ASSIGNMENTS, TO JOHN Q. SHERMAN, OF DAYTON, OHIO

CASH REGISTER

Application filed October 4, 1926. Serial No. 139,440.

This invention relates to cash registers and one object of the invention is to provide a mechanism of this character which will be simple in construction, positive in operation, and in which the several operations will be so safeguarded as to prevent inaccurate or fraudulent manipulation thereof.

A further object of the invention is to provide means for positioning the counterwheels, in registering position, with exact accuracy.

A further object of the invention is to provide selectively operated means for individually operating the plurality of counterwheels, said means having associated therewith means for transferring the count from one individually operated counterwheel to another.

A further object of the invention is to provide automatically operated means for positively connecting each individually operated counterwheel with its driving member during the registering operation.

A further object of the invention is to provide a resetting device having self-releasing means for interrupting the movement thereof when the counterwheels have been restored to their initial positions.

A further object of the invention is to provide means to prevent the resetting of the counterwheels by an unauthorized person.

A further object of the invention is to provide means to lock the registering mechanism against operation during the resetting of the counterwheels.

With the above primary and other incidental objects in view as will more fully appear in the specification, the invention consists of the features of construction, the parts and combinations thereof, and the mode of operation, or their equivalents, as hereinafter described and set forth in the claims.

In the accompanying drawings, Fig. 1 is a front elevation of a machine embodying my invention with the cabinet removed; Fig. 2 is a rear elevation of the same, with the key bars in section; Fig. 3 is a top plan view of the machine, partly broken away; Fig. 4 is a sectional view taken on line 4—4 of Fig. 1, looking in the direction of the arrows; Fig. 5 is a sectional view taken on the line 5—5 of Fig. 1, looking in the direction of the arrows; Fig. 6 is a section taken on line 6—6 of Fig. 4; Fig. 7 is a section taken on the line 7—7 of Fig. 4; Fig. 8 is a section taken on the line 8—8 of Fig. 7, on an enlarged scale; Fig. 9 is an enlarged detail elevation of one of the counterwheels; Fig. 10 is an enlarged detail view of the self-releasing stop for the resetting mechanism, the same being a section on the line 10—10 of Fig. 7; Fig. 11 is a detail view of the transfer mechanism for the individually operated counterwheels; Fig. 12 is a detail view of the automatically operated device for locking the individually operated counterwheels to their driving members; Fig. 13 is a detail view of the key controlled locking device for the operating mechanism; Fig. 14 is a section taken on the line 14—14 of Fig. 1; Fig. 15 is a detail view of the counter transfer mechanism shown in Fig. 11; and Fig. 16 is a detail view of a controlling bar for the drawer actuated locking arm.

In these drawings I have illustrated one embodiment of my invention, but it will be understood that this particular embodiment has been chosen for the purpose of illustration only, and that the various parts of the mechanism may take various forms and various arrangements without departing from the spirit of the invention.

As here shown the machine comprises a main frame consisting of end members 1 and 2 connected one to the other by tie bars 3, 4 and 5, and by a supplemental frame 6 mounted in the upper portion of the main frame. The lower portion, or base, of the main frame is provided with a compartment 7 to receive a cash drawer 8, which may be slidably mounted therein in any suitable manner. The register, on which the computation is effected, may be of any suitable character and may be mounted in any suitable location, but as here shown this register comprises a series of counterwheels rotatably mounted in a shaft 9 mounted in the supplemental frame 6. In the present machine this shaft also constitues the resetting shaft for the counterwheels and it is, therefore, journaled in the frame. The counterwheels may take various forms and either visual indicating wheels, printing wheels, or both, may be employed. In the present instance, the counterwheels are visual indicator wheels. The register consists primarily of a units counterwheel 10, a tens counterwheel 11, and a hundreds counterwheel 12. To enable the registration to be quickly effected, these several counterwheels are individually operated so that any one or all of them can be simultaneously operated in adding an item thereto. In addition to the individually operated counterwheels the register may comprise such additional counterwheels as may be desired. In the present arrangement, the units and tens counterwheels register cents and the hundreds counterwheel registers dollars. In addition to these three counterwheels, I have provided three other counterwheels 13 to register dollars and these counterwheels 13 are driven from the hundreds counterwheel 12 through transfer mechanism of a well known character, which need not be here described. Each of the individually operable counterwheels 10, 11 and 12, is provided with a separate actuating device, these actuating devices being independently operable so that any of the three counterwheels may be operated independently of the other. In the present construction, this actuating device is in the form of a toothed segment 15 pivotally mounted near its lower end on a shaft 16 supported at its ends in the end members 1 and 2 of the main frame. Each segment meshes with a gear 17 mounted on the counter shaft, or resetting shaft 9 and operatively connected with the corresponding counterwheel, and forming a driving member for that counterwheel. The segment is permanently in mesh with its gear and in order that the actuating segment may return to its initial position without imparting reverse movement to the counterwheel, a one-way clutch connection is interposed between the driving member and the counterwheel. As here shown the driving gear has an elongated hub 18 on which is mounted a clutch member 19, which is capable of axial movement and is held against rotary movement relatively to the driving gear. To this end, the hub 18 may be provided with flat sides, as shown at 20, in Fig. 8, and the opening in the clutch member shaped to fit about this irregular surface. The clutch member, as here shown, is provided in its operative face with an annular series of ratchet teeth 21 adapted to engage and cooperate with a corresponding series of ratchet teeth 22 carried by a clutch member 23 rigidly secured to the counterwheel. A spring 24 coiled about the hub 18 of the driving gear holds the clutch member 19 yieldably in engagement with the clutch member 23, the ratchet teeth being so arranged that upon the forward movement of the driving gear 17, the counterwheel will be rotated therewith, but on the reverse movement of the counterwheel, the slidable clutch member will yield and ride over the teeth of the clutch member 23, thereby permitting the driving gear to rotate in a reverse direction independently of the counterwheel. The clutch member 23 is also provided with a series of peripheral ratchet teeth 25 with which there engages a spring pressed pawl 26 to hold the counterwheel against reverse movement, as shown in Fig. 11. This pawl is here shown as mounted on a shaft 27 mounted in a bracket 28 carried by the supplemental frame 6.

Selective means are provided for independently operating the respective actuating segments 15 and imparting thereto movements corresponding to the amount of the registration which is to be made. Preferably the selective mechanism is in the form of a plurality of keys 29 pivotally mounted on the shaft 16 and having rearwardly extending end portions 30. These keys are divided into three groups, one for each of the actuating segments 15. The keys of the right hand group in Fig. 6 are numbered from one cent to nine cents, inclusive. The keys of the second group are numbered from ten cents to ninety cents, inclusive, in multiples of ten, and the keys of the third group are numbers from $1.00 to $9.00, inclusive. The keys are so connected with the actuating segment that the operation of a selected key will cause the segment with which that key is connected to be moved a distance corresponding to the value or the denomination of the key depressed, that is, if a five cent key is depressed, the actuating segment will be moved a distance sufficient to cause the units counterwheel to advance five points, while if the sixty cent key is depressed the corresponding actuating segment will be moved a distance sufficient to cause the tens counterwheel to be advanced six points, thus adding sixty to the registration. It will be apparent, therefore, that by operating a single key in one or more of the three groups, any item from one cent up to and including $9.99 may be registered by a single operation. The present register being provided with four dollar registration wheels, it will further be apparent that a total registration of $9,999.99 may be effected. The keys may be connected with the actuating segments, to selectively operate the same in any suitable manner. As here shown I have provided each of the three groups of keys with a separate device for connecting the same with its actuating segment and this connecting device is of such a character that the operation of each key will cause the segment to be moved a different distance. In the present instance, the connecting device comprises a plurality of cam fingers 31 rigidly connected one to the other and preferably formed integral with a sleeve 32 which is rotatably mounted on a shaft 33 mounted in the end members of the main frame. Rigidly connected with the sleeve 32, and if desired, formed integral therewith, is a rearwardly extending arm 34 having at its rear end a pin 35 slidably mounted in a slot 36 formed in the edge of a rock arm 37 which is rigidly secured to the corresponding segment 15. It will be noted that the actuating segments 15 are grouped slightly to the left of the center of the machine. In this arrangement the rock arms 37 for the second and third groups of key bars may be directly connected with the respective segments but the connecting device for the key bars of the first group being arranged well to the right hand side of the machine, it is necessary to provide special means for connecting the rock arm 37 with this group with its segment and I have therefore, provided the same with a yoke shaped portion 37$^a$, which extends about the hubs of the several intervening key bars and is connected with the actuating segment for the units counterwheel, as shown in Fig. 7. The cam fingers are arranged in the paths of laterally projecting pins 38 carried by the respective key bars and have their cam surfaces so arranged that the successive key bars, from lowest to highest denomination, will cause the actuating segment to be moved successively increasing distances, each distance being sufficient to cause the counterwheel to be advanced a distance corresponding to the denomination of the key which is operated. This mechanism will move the counterwheels to registering position with fair accuracy but the counterwheels will not always be moved into exact registering position. In order to secure an exactly accurate position of the counterwheels, I have provided an additional controlling device which will positively locate the counterwheel in its correct registering position. Each actuating member 15 is provided with a series of stops spaced successively increasing distances from the rear edge thereof, and as here shown, each segment has an opening 39, the forward edge of which is provided with a series of recesses 40, each constituting a stop adapted to receive a laterally extending projection or pin 41, carried by an arm 42, mounted on a shaft 43, extending lengthwise of the machine. Rigidly secured to the arm 42 is a rearwardly extending member, preferably in the form of a yoke 44, having a transverse portion 45 arranged in the paths of a series of cam arms 46 rigidly secured to and extending upwardly from the rear portions of the respective key bars, the cam arms being in the present instance, formed integral with the bars. The rear edges of these fingers constitute the cam surfaces and the several cam surfaces are spaced successively increasing distances from the axis of the key bars so that the operation of any key bar of a given group will cause the stop arm 42 to be moved downwardly a distance sufficient to bring the pin 41 into line with the stop corresponding to that key bar. If desired, the cross bars 45 may be held in contact with the cam fingers 46 by springs 250 acting on the yokes 44. It will be noted that the cam fingers 46 which actuate the stop arm are in permanent contact with the cross bar 45 of the yoke 44 while the pins 38 on the forward portions of the key bars are spaced some distance from the cam fingers 31 when the key bars are in their idle or normal positions. Consequently, when a key bar is depressed the stop arm 42 will be actuated in advance of the actuating segment 15 and the stop pin will be so arranged that the movement of the segment will be positively interrupted when the segment has moved a distance sufficient to effect the desired registration. The retaining pawl 26 for the counterwheel holds the latter against reverse movement and cooperates with the stop arm to cause the counterwheel to be positioned with exact accuracy and to retain the same in that position until the parts are actuated to release the counterwheel.

It is desirable after initial movement has been imparted to any one of the several keys that the other keys should be locked against movement and, further, that only one key of each group should be capable of operation at one time. I have, therefore, provided a key coupler which will lock against operation, all the keys except those which are simultaneously operated. As here shown, this key coupler is in the form of a yoke comprising arms 47 pivotally mounted on studs 48, carried by the respective end walls 1 and 2 of the main frame. These arms are rigidly connected at their outer ends by a bar 49 extending lengthwise of the machine and having its rear edge resting normally upon the upper edges of the several key bars immediately in front of the several cam fingers 46. Each cam finger is provided in its forward edge and adjacent to the upper edge of the key bar with a transverse slot 50 adapted to receive the rear edge of the coupler bar 49. The forward edges of the cam fingers above the slots 50 are curved substantially about the axis of the stud 48 as shown at 51. When a key is operated the coupler bar 49 will be moved upwardly therewith and because of the different cents about which the key bar and the coupler move, the rear edge of the coupler bar will be caused to enter the slot 50 in the key which had been actuated, thus permitting that key to continue its upward movement without interference by the coupler bar. The first portion of the movement of the coupler bar, which will be completed before the movement of the actuating segment 15 begins, will carry the edges of the coupler bar beyond the slots in the cam fingers 46 of the remaining key bars, thus bringing the coupler bars into the paths of the forward edges of these fingers and thereby locking the fingers and consequently the key bars against operative movement. As many keys as can be depressed simultaneously may be operated at one time, but the remaining keys will be locked against operation, and as will be hereinafter explained, only one key in each group can be operated at one time. Therefore, it is possible to operate one, two or three keys simultaneously and because of the arrangement of the key coupler, the movement of a plurality of key bars to which initial movements have been imparted can be completed by completing the operation of any one of those key bars. This is due to the fact that the key coupler bar will have entered the slot 50 in each of the plurality of key bars to which initial movement has been imparted, and the upward movement of the coupler bar will be continued by completing the depression of any one key bar, thereby causing the coupler bar to lift the other key bars to which initial movement has been imparted and carry them along with the key which is being operated. The key coupler bar 49 is of considerable weight and will serve to return the several key bars which have been operated to their normal positions by gravity but in order to secure a quick and positive operation of the parts I have provided the key coupler with an arm 251 and the lower end of which is actuated upon by a spring 252 which serves to move the key coupler and consequently the key bars to their normal positions. While the return of the key bars and the stop arm 42 to their normal positions would tend to move the actuating segments to their normal or neutral positions I prefer to provide other means for this purpose and I have here shown the lower end of each actuating segment as acted upon by springs 52 which move the same in a reverse direction. If desired, the key coupler may also be provided with means to positively insure the return of the actuating segments to their normal positions and to this end I have secured to this coupler bar 39 three upwardly extending fingers 53 arranged to engage rearwardly extending projections 54 rigidly connected with the respective segments and if desired, formed integral with the rock arms 37 by which the segments are actuated. In this manner the actuating segments are positively positioned in their normal positions at the end of each registering operation.

As has been stated it is desirable that only one key of each group should be operated at one time and to prevent the simultaneous operation of two or more keys in any group, I have caused the key bars to be extended rearwardly through spaces formed between a plurality of locking arms 55. These locking arms are pivotally supported at their lower ends on the tie bar 6 of the main frame and are arranged in three groups, corresponding to the three groups of key bars. Each locking arm is provided at its upper end with a head 57, having its upper and lower edges oppositely beveled. These heads lie above the rearwardly extending portions 30 of the key bars when the latter are in their normal positions. When a single key bar is actuated it will move upwardly between the heads of the adjacent locking arms, these arms moving laterally to permit the heads to separate. The separation of the heads of the two locking arms will impart movement to the other locking arms of that group and the lateral movement of the arms is so limited by the key bars, which extend between the same, that two key bars cannot simultaneously pass between the heads of the respective locking arms. If desired, abutments 56 may be arranged at the ends of each group of locking arms to positively limit their movement, but this is not essential. When the abutments are employed the distance between the same exceeds the combined widths of the several heads 57 by an amount slightly greater than the thickness of a single key bar, but less than the combined thickness of two key bars. Consequently, when a single key bar is actuated, its upper edge will engage the inclined edges of the heads of the adjacent locking arms and these heads will move laterally a distance sufficient to permit of the passage of the key bar, but if two key bars are actuated simultaneously, the end locking arms will engage the abutments and positively prevent the heads from spreading sufficiently to permit the passage of the two key bars. Therefore, neither key bar can be actuated until one or the other has been released. By pivotally mounting the locking arms 55 at their lower ends, I secure a very easy and free operation of the locking device because the inclined or beveled edges of the locking heads will offer such less resistance to the movement of the key bars when this movement is away from their axes than it will when the movement is toward the axes. The several bars are held in line one with the other by means of a rod 58 extending lengthwise of the frame in the rear of the arms.

I have also provided means for forcing the movable clutch members 19 into operative engagement with the respective clutch members 23 of the several counterwheels and for positively holding them in such engagement during the registering operation, thereby insuring the correct movement of the counterwheel. To accomplish this I have rigidly secured to the shaft 27, a series of arms 59 having their free ends curved, as shown at 60, and adapted to enter the spaces between the driving gears and slidable clutch members of the respective counterwheels, the thickness of the locking arm being such as to force the slidable clutch member to the extreme limit of its movement and to hold the same in that position. Preferably this locking device is actuated upon the first movement of a key bar and is held in its locking position until the operative movement of the key bar is completed. In the present construction the shaft 27 to which the several locking arms are rigidly secured, has rigidly secured thereto, a rock arm 61 which is connected by a link 62 with one arm of a lever 63 which is pivotally mounted on the supplemental frame and is acted upon by a cam 64, which is rigidly secured to a shaft 65. This shaft has secured thereto, near the end member 1 of the main frame, a gear 66 which meshes with a toothed segment 67 which is rigidly secured to the adjacent arm 47 of the key coupler, thereby causing the shaft to be rotated whenever any movement is imparted to a key. In the present arrangement of the actuating mechanism the lever 63 is in the form of a bellcrank lever having a vertical arm 68 pivotally connected at its lower end with the link 62 and having a substantially horizontal arm 69 on the rear end of which is pivotally mounted a dog 70, the nose of which is arranged to travel over the peripheral edge of the cam 64. The movement of the pivotal dog in the direction of operative movement of the cam is limited by the contact of a stop or lateral lug 71 on the outer end of the dog with the end of the arm 69 of the bell crank lever. A spring 72 holds the stop 71 normally in engagement with the end of the lever. Consequently, when the cam is rotated in the direction of the arrow in Fig. 12, as it will be when operative movement is imparted to any key, the nose of the dog will ride over the edge of the cam and the bell crank lever will be rocked about its axis to move the locking arms into their operative positions and this operation will take place during the interval between the first movement of the key bar and the beginning of movement of the actuating segment 15. As the key bar nears the completion of its movement the portion 73 of the cam 64 will pass the nose of the dog and immediately thereafter a projection 74 carried by the cam will strike a finger 75 secured to the vertical arm 68 of the bell crank lever and force this arm forwardly, thus moving the locking arms 59 into their inoperative positions and leaving the several clutches free to yield upon the return movement of the driving gears. Upon the return movement of the keys the shaft 65 and cam 64 will be rotated in a reverse direction, the dog 70 yielding against the tension of the spring 72 to permit this movement to take place without causing the operation of the bell crank lever and locking arms.

Inasmuch as the units, tens and hundreds counterwheels are independently operated, it is not possible to utilize transfer mechanism of the type which is usually interposed between adjacent counterwheels and I have, therefore, provided a transfer mechanism which is actuated from the key bars, but is controlled by the position of the counterwheel of lower denomination. There are two of these transfer devices, one for transferring from the units counterwheel to the tens counterwheel, and one for transferring from the tens counterwheel to the hundreds counterwheel, and the two devices are identical in construction, except for one feature which will be hereinafter explained. This transfer mechanism comprises an actuating member which in the present instance, is in the form of a reciprocatory pawl 76 the nose of which is arranged adjacent to the peripheral ratchet teeth 25 of the clutch member 23 on the counterwheel to which the count is to be transferred. This pawl extends through a guideway 77 in the supplemental frame 6 and is provided at its rear end with a bifurcated portion 78 which embraces the hub of a cam 79 rigidly secured to the shaft 65. The cam 79 is concentric with the exception of a recess 80 adapted to receive a pin 81 secured to the pawl arm. The pin is held firmly against the edge of the cam by means of a spring 82, connected at one end with a pawl and at the other end with a part of the supplemental frame. Operative movement is imparted to the pawl by means of a cam 83 rigidly secured to the shaft 65 on that side of the pawl opposite the cam 79. If desired, the two cams may be formed in a single piece. This second cam 83 acts on a dog 84, which is pivotally mounted on the bar of the pawl adjacent to the cam and is free to yield under the action of the cam when the shaft 65 rotates in an operative direction, but is held against movement in the opposite direction so that upon the return movement of the shaft, the cam will so engage the dog as to impart longitudinal movement to the pawl. As here shown, the dog has a projection 85 engaging beneath the edge of the pawl arm to limit its movement in one direction and a spring 86 tends to hold the projection 85 in engagement with the edge of the pawl arm. The pawl arm is cut away, as shown at 87, to permit the swinging movement of the projection 85. The forward end or nose of the pawl 76 is supported normally in such a position that it will not engage the ratchet teeth 25 when operative movement is imparted thereto, but means are provided for causing it to be moved into operative relation with the ratchet teeth when it is desired to transfer the count from one counterwheel to the other. For this purpose the forward end of the pawl is supported on an arm 88 which is pivotally mounted at its lower end and is provided at its upper end with two shoulders 89 and 90, which form seats to receive a lip or transverse projection 91 carried by the pawl arm and to thus support the pawl in either of two positions, it being obvious that when the lip 91 is in engagement with the upper shoulder 89, the pawl will be supported in its inoperative position and when the lip is in engagement with the lower shoulder 90 the pawl will be supported in its operative position. The lip 91 is held firmly in contact with the shoulder by means of a spring 92 extending between the same and a portion of the supplemental frame. The frictional contact between the lip 91 of the pawl and the shoulder of the supporting frame is sufficient to cause the arm to move with the pawl so that the arm forms, in effect, a rocking support for the pawl. The supporting arm is provided with a forwardly extending projection 93, which is so arranged that the initial movement imparted to the pawl by the cam 79 will move the same into the path of a projection or pin 94 carried by and extending laterally from the counterwheel of lower denomination. This pin is so arranged with relation to the indications on the counterwheel that when the indication 9 is moved out of registering position and the cipher is moved into registering position, the pin 94 will be moved past the projection 93 on the supporting arm 88. Inasmuch as the supporting arm has been moved inwardly by the cam 79 to bring the projection 93 into the path of the pin, the pin will engage the projection and force the supporting arm rearwardly so as to move the shoulder 89 out of line with the lip 91 and permit the latter to drop down onto the shoulder 90, thus bringing the pawl into operative relation with the ratchet teeth. It will be noted that the pawl is held against rearward movement with the supporting arm, under the action of the pin 94, by the concentric surface of the cam 79 which is in engagement with the pin 81. The cam 83 having moved past the dog 84 during the first portion of the movement of the cam 79 will lie on the opposite side of that dog and when the shaft 65 is moved in a reverse direction, as the mechanism is restored to its initial position, the cam will engage the dog and impart longitudinal movement to the pawl arm, thus causing it to engage one of the ratchet teeth and rotate the counterwheel of higher denomination one point. When the cam 83 clears the dog, the spring 82 will retract the pawl. The rotation of the ratchet wheel by the pawl will have elevated the pawl into such a position that the lip 91 will engage the upper shoulder 89, of the supporting arm when the pawl arm is retracted, thereby restoring the mechanism to its normal inoperative position. If desired, the overthrow of the counterwheel by the pawl may be prevented by mounting on the supplemental frame adjacent to the upper edge of the pawl arm a stop or pin 95 and providing the upper edge of the pawl with a raised portion having a tapered forward edge, as shown at 96, arranged to engage the pin 95 just as the pawl completes its forward movement and thereby force the nose of the pawl into engagement with the ratchet wheel with a wedging action and positively prevent the further rotation of the ratchet wheel. It is important that the transfer of the count from the units counterwheel and the tens counterwheel should be completed before the count is transferred from the tens counterwheel to the hundreds counterwheel and this is accomplished by so arranging the cam 83 for the first pawl, that it will complete the operative movement of its pawl before the cam for the second transfer pawl, which is shown at 97, engages its pawl.

As has been stated, the counter shaft 9 also constitutes a resetting shaft and to this end it is here shown as provided with a longitudinal groove 98 converting the shaft into what is, in effect, a single toothed ratchet wheel. Mounted on each counterwheel is a spring actuated pawl 99, cooperating with the notch or tooth of the resetting shaft and so arranged with relation thereto that when the counterwheel is rotated in an operative or registering direction, the pawl will ride over the tooth on the shaft without interfering with the movement of the counterwheel, in a forward direction, the tooth will pick up the pawl of each counterwheel and will move the same to their initial positions, it being understood that the pawls are so arranged on the several counterwheels that when they are all in engagement with the tooth of a shaft, the several counterweels will all occupy the same position. The shaft may be rotated in any suitable manner but, as shown, it is provided with a knob or handlle 100, (Figs. 1, 3 and 7) for this purpose. To prevent the overthrow of the counterwheels upon the resetting operation I have provided a self-releasing stop which will positively interrupt the rotation of the shaft at the end of one complete rotation, but will then release the shaft for further rotation. Rigidly secured to the shaft is a ratchet wheel 101 with which cooperates a spring pressed pawl 102 to hold the shaft against reverse movement. The ratchet wheel is provided on its periphery with a smooth space, that is, a concentric surface, as shown at 103, which may be formed by omitting one of the ratchet teeth. This space is so arranged with relation to the shaft 9 that the pawl will be in engagement therewith when the counterwheels are at their initial or zero positions. Rigidly secured to the shaft 9 adjacent to the ratchet wheel 101 is a locking disc 104 to which is rigidly secured a laterally extending stud 105. Pivotally mounted adjacent to and on an axis parallel with the shaft 9 is a stop arm 106, the free end of which is adapted to be moved into and out of the path of the stud or pin 105 on the disc 104. A spring 107 acting on the stop arm tends to hold the same normally in its inoperative position. Pivoted adjacent to the stop arm 106 and preferably on an axis coincident with the axis thereof, is a controlling arm 108, the free end of which is adapted to ride over the periphery of the disk 104 and to enter a recess 109 in said disc when the shaft is in its initial position. A spring 110 acts on the controlling arm 108 to hold the same in contact with the disk. An operative connection is established between the controlling arm and the stop arm which will permit the controlling arm to have a certain amount of movement relatively to the stop arm but will enable the same to control the movement of the stop arm. As here shown the stop arm has an upwardly extending portion provided with a laterally extending lug 111, which overlaps the upper edge of the controlling arm 8. When the parts are in their normal or initial position, the stop arm will be held out of the path of the stud 105, the end of the controlling arm will rest on the lower wall of the recess 109 and the nose of the pawl will lie in the smooth space in the ratchet wheel. The rotation of the shaft 9 to reset the counters to zero will turn the disc in the direction of the arrow in Fig. 10 and will cause the same to rock the controlling arm about its axis, thereby causing the upper edge of the same to engage the lip 107 on the stop arm and lift the end of this arm into the path of the stud 105. Because of the movement which it is necessary to impart to the controlling arm before it will actuate the stop arm, the rotation of the disk will have carried the stud beyond the end of the stop arm before the latter is moved into operative position and the stop arm will not interfere with the rotation of the shaft until the same has completed one rotation, at which time the stud will engage the end of the stop arm, and the movement of the shaft will be positively interrupted. Just as the stud engages the end of the stop arm, or when the stud has partially entered a recess or seat 112 in the end of the stop arm, the end of the controlling arm will pass off the periphery of the disk and drop into the recess 109, thereby releasing the stop arm from its control. The length of the controlling arm is such that it does not extend for the full depth of the recess 109 and consequently both the recess and the ratchet wheel are both capable of a slight reverse movement which will be sufficient to release the stop arm from its contact with the stud 105 and permit the same to move into its normal or inoperative position, thus releasing the shaft for further rotation. In practice, it is not necessary to manually actuate the shaft in a reverse direction because when the stop arm has been released by the controlling arm, the pull of the spring on the stop arm will be sufficient to move it out of engagement with the stud, the disk yielding sufficiently to permit of this movement.

One of the features of the present construction, is the fact that the counter and computing mechanism including all the operating parts carried by the several shafts 9, 27 and 65 are carried entirely by the supplemental frame 6, as shown in Figs. 3, 11 and 12. The computing mechanism may thus be bodily removed as an assembled unit by detaching the auxiliary frame 6 from the main frame of the machine. This is a very material advantage in correcting disarrangement or impairment of the mechanism. The interchangeability of the counter and computing mechanism as an assembled unit enables one to be quickly substituted for another without necessity of removing the machine or interfering with the operation of the machine for any extended period of time.

It is desirable that the resetting operation of the counterwheels shall be effected only by a duly authorized person and I have in the present machine provided a key controlled lock to normally prevent the resetting of the counterwheels. To this end, I have rigidly secured to the shaft 9, a disk 113 having in its periphery a radial notch or slot 114 which notch is adapted to receive the edge of a locking disk 115 mounted for rotation about an axis at right angles to the disk 113. The locking disk 115 is provided with a notch 116, adapted to be moved into line with the disk 113 so that the latter may be rotated and the counterwheels reset. In the present instance, the disk 115 is connected with the barrel of a key operated lock 117 so that the locking disk is moved by the key itself. In order to prevent the operation of the registering mechanism during the resetting of the counterwheels, I have provided a lock for the registering mechanism which will be operative whenever the resetting mechanism is released for operation. As here shown, this locking device comprises a disk 118 rigidly secured to the shaft 65 and having therein a peripheral recess 119. Pivotally mounted on a bracket 120 carried by the supplemental frame 6 is a locking arm 121 having at its lower end a transverse lug 122 arranged to be moved into and out of the recess 119 in the disk 118. The locking disk 115 for the resetting mechanism has a cam shaped peripheral portion engaging the edge of the arm 121 and so arranged that when the disk 115 is in its locking position, the locking arm 121 may be moved to its inoperative position, thus releasing the shaft 65 for operation. When the locking disc 115 is actuated to release the resetting mechanism the lug on the locking arm will be moved into the recess 119 and the disk locked against rotation, the arrangement of the parts being such that the lug will enter the recess before the resetting mechanism is unlocked. The locking arm 121 is connected by means of a link 123 with an arm 124 which is acted upon by a spring 125, which in turn tends to hold the locking arm 121 against the edge of the disc 115 and to withdraw the lug 122 from the recess in the disk 118 when the disk 115 is returned to its locked position.

It is sometimes desirable that the registration effected by the counterwheels should be accessible only to a properly authorized person or persons, and in the present machine, a flash or blind 126 is mounted for movement into and out of line with the sight opening in the cabinet, through which the reading of the counters is taken. This blind is of ordinary construction and is pivotally mounted on the shaft 9 on opposite sides of the register and the operating device therefor is of such character that it will be controlled by the key lock 117, thus preventing the inspection of the counters by any one not provided with a key. In the present arrangement the blind is rigidly connected with a yoke 127 also pivotally mounted on the shaft and of which the arm 124 is a part. Thus it will be seen that the position of the blind will be controlled by the lock arm 121 and that the blind will be moved downwardly and into its inoperative position whenever the locking arm is moved into operative relation to the disk 118 and that when the locking arm is moved into inoperative position the blind will be restored to its operative position. If desired, a separate register may be provided to make a record of the number of times the counters are reset, thus enabling the proprietor to ascertain whether or not the register has been reset by a person other than himself. As here shown, an ordinary Veeder counter 128 is mounted on the supplemental frame adjacent to the counter shaft and is so connected with some part of the controlling device for the resetting mechanism that it will be operated whenever the resetting mechanism is operated. As here shown, a slotted arm 129 is mounted on the counter shaft and embraces a pin 130 carried by the actuating arm 131 of the Veeder counter. This slotted arm is operatively connected with, and in the present instance, is formed integral with the arm 124, which in turn is connected with the key lock, therefore, each time the resetting mechanism is unlocked, and put in condition for operation, the counter 128 will be actuated.

If desired, means may also be provided for locking the registering mechanism against operation when the cash drawer is open and, as here shown, I have pivotally mounted on one end of the machine, see Fig. 5, a locking arm 132 which is pivotally supported at its upper end and has its lower end arranged to extend into the path of the cash drawer 8, as shown at 133. A spring 134 acts on the arm to hold the lower end thereof normally in engagement with the lower end of the cash drawer. Intermediate its ends the lock arm is provided in its forward edge with a locking shoulder 135 and that portion of the forward edge of the arm just above the shoulder is preferably curved substantially on the axis of the key coupler arm 47. The arrangement of the locking arm is such that when the drawer is closed and the arm is in its rearmost position, the shoulder 135 will lie just out of line with the rear edge of the key coupler bar 49 so that that bar can be elevated. The cash drawer is held normally in its closed position by a spring pressed plunger 136 (Figs. 4 and 6), the end of which is held normally in an opening in a locking plate 137 carried by the drawer. This plunger extends upwardly through a slot 138 in the rear edge of the key coupler bar 49 and is provided at its upper end with a stop, such as a pin 139, which will be engaged by the coupler bar as the latter nears the limit of its upward movement and the plunger elevated to release the cash drawer. The cash drawer when so released is opened by a spring 140. The outward movement of the drawer is limited by a latch 141, arranged to engage a fixed stop 142, the latch being preferably pivoted so that it can be manipulated to release the drawer and permit its removal. It will be apparent, therefore, that the drawer will be released and the locking arm caused to move forwardly while the coupler bar is in its elevated position. Upon the downward movement of the coupler bar, the locking arm will yield and when the coupler bar has moved past the shoulder 135, the locking arm will spring forward and carry the shoulder above the coupler bar, thus locking the same in its lowermost position, and thereby locking the whole registering mechanism against operation. The locking arm will be moved into its inoperative position by the contact of the drawer therewith when the latter is closed, but until the drawer is closed the mechanism cannot be operated. In some instances, it is desirable to operate the register while the cash drawer is open and to permit of this I have provided a detent for holding the locking arm in its retracted position, regardless of the position of the cash drawer. As here shown, (Figs. 5 and 16) I have slidably mounted on one side of the base, in which the cash drawer is mounted, a bar 143, the rear end of which is arranged to contact with the locking arm 132, and when the slide bar is locked in its rearmost position to hold the locking arm against movement. The slide bar is here shown as having two recesses 144 and 145, either of which may be caused to embrace a fixed stop 146 so as to hold the slide bar either in its operative or inoperative position.

Suitable indicating devices are arranged at the rear of the machine to indicate both to the operator and to the customer the amount of the item registered. As here shown, these indicators are in the form of tablets 147, each having a stem or bar 148 slidably mounted in the rear portion of the main frame and so arranged that the lower end of, or a shoulder formed on, this stem will be engaged by one of the key bars, and the tablet elevated when the key bar is actuated, it being understood that there is a tablet corresponding to each key. The stems of several tablets are provided with stops 149 and 150 arranged to engage a locking plate 151 having locking edges arranged in different vertical planes to be brought into operative relation respectively with the stops 149 and 150. The locking plate is here shown as provided with arms pivotally mounted on the main frame and a spring 152 tends to hold the locking plate normally in its operative or locking position. It is desirable that the tablet should remain in indicating position until the machine has been again operated. The operating mechanism for the locking plate is, therefore, of such character that it will be moved into its inoperative position at the beginning of each registering operation, to release the tablets which have theretofore been elevated, and will be restored to its locking position near the end of the registering operation, and after the tablets representing the new registration have been elevated. To this end I have connected with the locking plate an actuating arm 153 which is acted upon by a cam 154 secured to the shaft 65. The shape of the cam is such that the first movement of the shaft will retract the locking plate 151 and the same will be held retracted until the shaft 65 nears the end of its movement when the cam will release the lever 153 and permit the locking plate to be moved into its operative position by the spring 152. The contact portion of the lever 153 is in the form of a pivoted dog which will yield to permit the lever to move past the cam on its return movement.

At the extreme right hand side of the machine is shown a key 155 marked "No sale" which is used to gain access to the cash drawer when no sale has been made, and it is not desired to effect any registration. The arrangement and control of this key is similar to those of the other keys with the exception that it is not connected with any actuating segment 16. It does, however, operate the key coupler to lock the other key bars against operation and is controlled by the pivotal locking arms in the rear of the machine. It is desirable to maintain a record of the number of operations of this "No sale" key and to this end I have mounted on the resetting shaft 9 near the right hand end of the machine a group of counterwheels 156, of ordinary construction and operation, which are actuated by means of a connecting rod 157, (Figs. 5 and 7), connected at its lower end with the "No sale" key bar, in front of the shaft 16, and connected at its upper end with the actuating pawl for the units counterwheel, the arrangement being such that the pawl will advance the counter one step on each operation of the key bar. I have also mounted on the resetting shaft adjacent to the "No sale" counter 156 a customer counter which will register each operation of the machine, thus providing a record of the number of times the machine has been operated during the course of the day or other period of time. This counter may be of any suitable construction and is here shown as an ordinary multiple pawl operated counter 158 (Figs. 5 and 7), the pawl arm 159 being actuated by a cam 160 mounted on the cam shaft 65. Both the "No sale" counter and the customer counter are reset by the shaft 9 simultaneously with the resetting of the register counters, thus insuring the complete resetting of the machine.

If desired, an audible signal may be provided, which will be sounded upon each operation of the register. In the present instance, a bell 161 (Figs. 1 and 14), is mounted at one end of the frame and the bell hammer or tappet 162 is pivotally mounted on the shaft 16 and is acted upon by a spring 163, which tends to move the same toward the bell. The hub portion of the tappet arm is provided with a rearwardly extending projection 164 arranged in the path of a finger 165 carried by the arm 47 of the key coupler and so arranged that upon the upward or operative movement of the key coupler the finger will engage the projection, retract the tappet arm against the tension of the spring 163 and then move past the end of the projection, retract the tappet arm against the tension of the spring 163 and then move past the end of the projection to release the arm and permit the tappet to be moved into engagement with the bell. The finger is pivotally mounted and is yieldable in a reverse direction, so that it will ride over the end of the projection 164 upon the reverse movement of the key coupler. In order to silence the bell in the event the signal is not desired, the tappet arm is provided with a downward extension 166 arranged to be engaged by a lug 167 on a bar 169, slidably mounted on the main frame and having a notch 170 to engage a fixed stop 171 which serves to hold the bar in its forward position in which position the tappet arm will be held in its retracted position so that the actuating finger 165 will pass the projection 164 without operating the same.

The mechanism as a whole is enclosed in a cabinet 172, having suitable sight openings for the reading of the counters and the indicator tablets and having slots through which the key bars project.

From the above description it will be apparent that there is thus provided a device of the character described possessing the particular features of advantages before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. In a mechanism of the character described, counterwheels of different denominations, a transfer member to advance the counterwheel of higher denomination, operating means for the counterwheels, means actuated by said operating means to impart operative movement to said transfer member, and detent means released by the counterwheel of lower denomination normally rendering said transfer member normally ineffective, said detent means being movable into and out of operative relation with said counter wheel and means for temporarily moving said detent means into operative relation therewith in advance of the operative movement of said transfer member.

2. In a mechanism of the character described, counterwheels of different denominations, a transfer member movable into and out of operative relation to the counterwheel of higher denomination, operating means for the counterwheels, means actuated by said operating means to impart operative movement to said transfer member, and means controlled by the counterwheel of lower denomination to control the position of said transfer member with relation to the counterwheel of higher denomination, said control means being normally positioned beyond the range of operation of the counterwheel of lower denomination, and means for moving said control means into operative relation therewith preparatory to the actuation of the transfer member.

3. In a mechanism of the character described, counterwheels of different denominations, a transfer member movable into and out of operative relation with the counterwheel of higher denomination, means for actuating said transfer member, and detent control means controlled by the counterwheel of lower denomination movable into and out of the field of operation of said counterwheel of lower denomination by said actuating means to control the position of said transfer member.

4. In a mechanism of the character described, counterwheels of different denominations, a transfer member movable into and out of operative relation with the counterwheel of higher denomination, means for actuating said transfer member, a supporting member to support said transfer member normally in an ineffective position, said supporting member being normally positioned beyond the range of operation of the counterwheel of lower denomination, means for moving said supporting member into operative relation with said counterwheel preparatory to disengagement of the supporting member from said transfer member, and means controlled by the counterwheel of lower denomination to disengage said supporting member and permit said transfer member to be moved into its operative position.

5. In a mechanism of the character described, counterwheels of different denominations, a transfer member movable into and out of operative relation with the counterwheel of higher denomination, means for actuating said transfer member, a pivoted supporting member having a seat to engage a part of said transfer member and support the latter in its inoperative position, a spring acting on said transfer member to hold said part thereof firmly in engagement with said seat, whereby said supporting member will move in unison with said transfer member under influence of said actuating means by which the supporting member is moved into operative relation with the counterwheel prior to the release of said transfer member, and means controlled by the counterwheel of lower denomination to actuate said supporting member to move said seat out of engagement with said transfer member and permit the latter to move to its operative position.

6. In a mechanism of the character described, counterwheels of different denominations, a transfer member movable into and out of operative relation with the counterwheels of higher denomination, and having a transversely extending projection, means to impart operative movement to said transfer member, a supporting member having a shoulder to engage said projection and support said transfer member in an inoperative position, means to hold said projection firmly seated on said shoulder, whereby said supporting member will normally move in unison with said transfer member, said movement imparting means being adapted to give to said supporting member and transfer member an initial advance movement in unison, and a further advance movement of the transfer member independent of the supporting member, said supporting member being moved into operative relation with the counterwheel by such initial unison movement, said supporting member having a part arranged adjacent to the counterwheel of lower denomination, and means carried by said counterwheel of lower denomination to engage said part of said supporting member and actuate the latter to move said shoulder out of engagement with said projection and permit said transfer member to move into its operative position.

7. In a mechanism of the character described, counterwheels of different denominations, a transfer member movable into and out of operative relation with the counterwheels of higher denomination, and having a transversely extending projection, means to impart operative movement to said transfer member, a pivotally mounted supporting member having two shoulders either of which may be engaged by the projection on said transfer member, the shoulders being so arranged that one of them will support the transfer member in an inoperative position and the other will support the transfer member in an operative position, a spring to hold said projection firmly in engagement with one of said shoulders, whereby said supporting member will move in unison with said transfer member, said supporting member being normally positioned beyond the range of operation of the counterwheel of lower denomination, means for transmitting to the supporting member and transfer member an initial unison advance movement and thereafter a further movement to the transfer member independent of said supporting member, said supporting member having a part projected into the field of operation of the counterwheel of lower denomination by the initial unison advance motion of the support and transfer member, and means carried by said counterwheel of lower denomination to engage said part of said supporting member and actuate the latter to move the first mentioned shoulder out of engagement with said projection on said transfer member and to permit the latter to move into engagement with the last mentioned shoulder.

8. In a mechanism of the character described, counterwheels of different denominations, a reciprocatory transfer member movable into and out of operative relation with the counterwheel of higher denomination, on oscillatory supporting device to support said transfer member normally in an inoperative position, an actuating part carried by the counterwheel of lower denomination, said supporting device having a projection movable into and out of the path of said actuating part of said counterwheel and adapted to be engaged thereby to cause said transfer member to be moved into its operative position, means for oscillating the supporting device relative to said counterwheels for imparting simultaneous initial longitudinal movement to said transfer member and said supporting device to move said projection into the path of said part of said counterwheel, and means for imparting operative movement to said transfer member.

9. In a mechanism of the character described, counterwheels of different denominations, the counterwheel of higher denomination having a ratchet wheel connected therewith, a transfer pawl movable into and out of operative relation to said ratchet wheel, means for imparting reciprocatory movement to said pawl upon each operation of the counterwheel of lower denomination, a supporting device having means to support said pawl normally in its inoperative position, said supporting device being movable relative to the counterwheel and transfer pawl, cooperating parts carried by said supporting device and the counterweight of lower denomination to cause said pawl to be moved into its operative position, and means for bringing said parts into cooperative relation.

10. In a mechanism of the character described, counterwheels of different denominations, a ratchet wheel connected with the counterwheel of higher denomination, a reciprocatory transfer pawl movable into and out of operation relation with said ratchet wheel, a pivoted supporting device having a shoulder to engage a part of said transfer pawl and support the same in its inoperative position, a spring to hold said part of said pawl in contact with said shoulder and to cause said supporting device to move with said pawl when reciprocatory movement is imparted to the latter through an oscillatory motion about its pivotal support into the field of operation of the counterwheel, a stud carried by the counterwheel of lower denomination, a projection carried by said supporting device and adapted to be engaged by said stud to move said shoulder out of engagement with said part of said pawl and permit the pawl to move to its operative position, a cam acting on said pawl to move said projection into the path of said stud, and other means to impart operative movement to said pawl.

11. In a mechanism of the character described, counterwheels of different denominations, a ratchet wheel connected with the counterwheel of higher denomination, a reciprocatory transfer pawl movable into and out of operative relation with said ratchet wheel, a pivoted supporting device having a shoulder to engage a part of said transfer pawl and support the same in its inoperative position, a spring to hold said part of said pawl in contact with said shoulder and to cause said supporting device to move with said pawl when reciprocatory movement is imparted to the latter, a stud carried by the counterwheel of lower denomination, a projection carried by said supporting device and adapted to be engaged by said stud to move said shoulder out of engagement with said part of said pawl and permit the pawl to move to its operative position, a cam means transmitting unison motion to said pivoted support and to said pawl to move said projection into the path of said stud upon movement of said cam in one direction and acting upon said pawl to impart to said pawl operative movement in the same direction independent of said support.

12. In a mechanism of the character described, counterwheels of different denominations, a ratchet wheel connected with the counterwheel of higher denomination, a reciprocatory transfer pawl movable into and out of operative relation with said ratchet wheel, a pivoted supporting device having a shoulder to engage a part of said transfer pawl and support the same in its inoperative position, a spring to hold said part of said pawl in contact with said shoulder and to cause said supporting device to move with said pawl when reciprocatory movement is imparted to the latter, a stud carried by the counterwheel of lower denomination, a projection carried by said supporting device and adapted to be engaged by said stud to move said shoulder out of engagement with said part of said pawl and permit the pawl to move to its operative position, and rotary actuating means operable in reverse directions and adapted by its movement in one direction to move said pawl and said supporting device in unison to position said projection in the path of said stud at the beginning of the registering operation and by its return rotation to further actuate said pawl in the same direction independent of said support to impart operative movement to said pawl after the operation of said counterwheel has been completed.

In testimony whereof, I have hereunto set my hand this 15 day of September, A. D. 1926.

WILLIAM M. CARROLL.